March 30, 1926.
J. C. TAPP
1,578,936
GASOLINE GAUGE FOR AUTOMOBILE ENGINES
Filed August 22, 1924
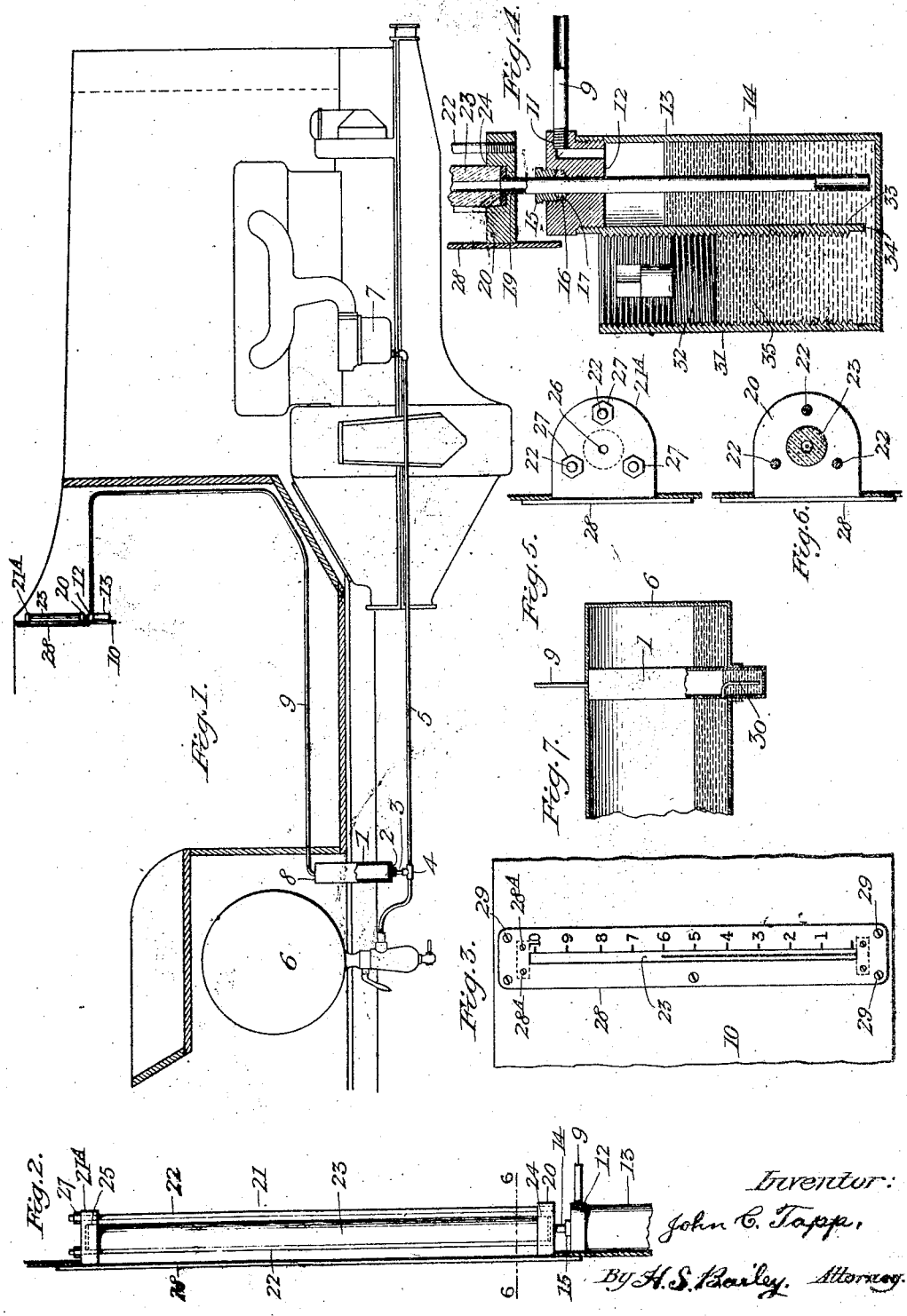
Inventor:
John C. Tapp,
By H. S. Bailey, Attorney.

Patented Mar. 30, 1926.

1,578,936

UNITED STATES PATENT OFFICE.

JOHN C. TAPP, OF MONARCH, COLORADO.

GASOLINE GAUGE FOR AUTOMOBILE ENGINES.

Application filed August 22, 1924. Serial No. 733,574.

*To all whom it may concern:*

Be it known that I, JOHN C. TAPP, a citizen of the United States of America, residing at Monarch, county of Boulder, and State of Colorado, have invented a new and useful Gasoline Gauge for Automobile Engines, of which the following is a specification.

My invention relates to a gauge for measuring the level of a liquid in a container and more particularly to a gasoline gauge of the type commonly used on automobiles.

The general object of the invention is a gauge which is simple in construction and operation, and can be installed at low cost.

For a full understanding of the invention and its mode of operation, I make reference to the accompanying drawings in which:

Figure 1, is a side elevation of the front end portion of an automobile showing the application of my gasoline measuring and indicating gauge to the gasoline supply pipe that conveys the gasoline from the gasoline supply tank to the carburetor.

Figure 2, is a side elevation of the measuring and indicating gauge.

Figure 3, is a front view of the indicator on the instrument board.

Figure 4, is a vertical section of the cylinder which contains the indicating fluid, and the inlet and outlet pipes and the lower end of the indicating and measuring gauge.

Figure 5, is a top view of the measuring gauge.

Figure 6, is a horizontal sectional view of the gauge, on the line 6—6 of Figure 2, and Figure 7, is a sectional view of a portion of the gasoline tank, showing the pressure cylinder arranged therein.

Similar letters of reference refer to similar parts throughout the several views.

In Fig. 1 of the drawings, 1 represents the pressure cylinder of my hydrostatic measuring and indicating gauge. The cylinder 1 is connected at its bottom 2 to the supply pipe 5, while at the top 8 it is connected by means of a pipe 9 to the instrument board 10. The position of the cylinder 1 relatively to the tank 6 is so chosen that so long as there is any gasoline in the tank, there is a hydrostatic pressure tending to force gasoline into the cylinder 1, the top of the cylinder 1 being disposed a substantial distance above the bottom of the tank 6. Thus the level of gasoline in the cylinder 1 will rise and fall in proportion to the amount of liquid in the tank and the air or gas in the cylinder will be under a pressure proportionate thereto.

The pipe or air line 9 is connected to the inlet 11 of a container 13 which is in communication at its bottom with an additional container 31. The container 31 is provided with a closure, preferably in the form of a plug 32 adapted to be displaced in vertical direction. To this end, the plug may be screw-threaded to co-operate with a similar screw thread on the interior of the container 31.

The inlet 11 into the container 13 is preferably effected through a stopper or cap 12 through which also extends a pipe 14 from near the bottom of the container upwardly into the gauge tube 23. The pipe 14 may be sealed against ingress of air by means of a packing gland 15, including suitable packing material in the recess 16.

The gauge glass 23 is preferably set into corresponding recesses 24 and 25 in blocks 20 and 21$^A$ interconnected by rods 22 which make screw-threaded engagement with one of the blocks, as for instance, the bottom block 20 and provided with nuts 27 at the other end for drawing the blocks toward each other upon the glass. In the top block 21$^A$ is provided a vent hole 26 through which air may pass into and out of the glass tube 23. The pipe 14 extends through a perforation 19 in the block 20.

While within the scope of the invention the containers 13 and 31 may be structurally independent, I preferably provide them as an integral unit with a common partition wall 33 providing the communication 34.

The tube 23 is set behind and exposed through the slot of a scale 28 graduated in suitable units. The scale is attached to the instrument board by means of screws 29, while the gauge may be supported on the scale by means of screws 28$^A$ extending into blocks 20 and 21$^A$.

The cylinder may be conveniently connected to the pipe 5 supplying gasoline to the carburetor 7, by means of a T-connection 4.

The operation is as follows:

According to the amount of gasoline in tank 6, the air pressure in line 9 will force more or less of the liquid in container 13 up through the pipe 14 into the gauge glass 23 so that the level of the liquid will indicate on the scale 28 the amount of the gasoline in tank 6. The plug 32 may be adjusted from time to time to bring the level of the liquid to the correct scale indication.

The cylinder 1 may be mounted directly in the tank 6, as indicated in Fig. 7. In that case the communication between the tank 6 and the cylinder 1 may be made by means of a tube 30 extending from near the bottom of cylinder 1 through the wall thereof.

Having described my invention what I claim as new and desire to secure by Letters Patent is:—

1. Apparatus for indicating the amount of gasoline in the supply tank of an automobile, comprising a vessel the bottom of which is disposed a substantial distance below the bottom of the tank and the top of which is disposed a substantial distance above the bottom of the tank, a fluid connection between the bottom of the tank and the bottom of the vessel, an indicating tube mounted on the dash board, a liquid container adjacent the indicating tube, composed of two compartments in juxtaposition and interconnected near the bottom, one of the compartments being closed and having a fluid connection from near its bottom to the bottom of the indicating tube, means normally disposed near the top of the other compartment and movable for displacement of liquid therein, and a fluid connection between said vessel and the top of the compartment having the connection to the indicating tube.

2. Apparatus according to claim 1, wherein the compartment containing the means for the displacement of liquid is tubular and provided with interior screw threads extending to near the bottom and the means for displacement of the liquid is a screw-threaded plug cooperating with said screw threads.

In testimony whereof I affix my signature.

JOHN C. TAPP.